(12) United States Patent
Sato et al.

(10) Patent No.: US 7,609,212 B2
(45) Date of Patent: Oct. 27, 2009

(54) PORTABLE WIRELESS UNIT

(75) Inventors: Kenichi Sato, Miyagi (JP); Yukinari Takahashi, Miyagi (JP); Satoshi Watanabe, Kanagawa (JP)

(73) Assignee: Panasonic Corporation, Osaka (JP)

( * ) Notice: Subject to any disclaimer, the term of this patent is extended or adjusted under 35 U.S.C. 154(b) by 357 days.

(21) Appl. No.: 11/718,165

(22) PCT Filed: Nov. 8, 2005

(86) PCT No.: PCT/JP2005/020771

§ 371 (c)(1),
(2), (4) Date: Apr. 27, 2007

(87) PCT Pub. No.: WO2006/049342

PCT Pub. Date: May 11, 2006

(65) Prior Publication Data

US 2009/0066585 A1     Mar. 12, 2009

(30) Foreign Application Priority Data

Nov. 8, 2004  (JP)  ............... 2004-323379

(51) Int. Cl.
*H01Q 1/24* (2006.01)
(52) U.S. Cl. ............... 343/702; 343/876; 455/575.3
(58) Field of Classification Search ........... 343/702, 343/725, 876; 455/557, 575.3, 575.7
See application file for complete search history.

(56) References Cited

U.S. PATENT DOCUMENTS 5,649,306 A * 7/1997 Vannatta et al. .......... 455/575.7
6,636,181 B2 * 10/2003 Asano et al. ............... 343/702
7,136,018 B2 * 11/2006 Iguchi et al. ............... 343/702
7,167,726 B2 * 1/2007 Ghosh et al. ............... 455/557

FOREIGN PATENT DOCUMENTS

| JP | 9-205476 A | 8/1997 |
|----|----|----|
| JP | 10-271192 A | 10/1998 |
| JP | 2003-298695 A | 10/2003 |
| JP | 2004-179995 A | 6/2004 |
| JP | 2004-242005 A | 8/2004 |

OTHER PUBLICATIONS

International Search Report for PCT/JP2005/020771, dated Dec. 27, 2005.

* cited by examiner

*Primary Examiner*—Hoang V Nguyen
(74) *Attorney, Agent, or Firm*—RatnerPrestia

(57) ABSTRACT

A portable wireless unit having high antenna performance, which comprises: a first case having a first antenna element, a second antenna element and a second feeding section; a second case having a third antenna element, a third feeding section and a circuit board provided with a ground pattern; and a coupling section consisting of first and second electrically connected conductive coupling elements and coupling the first case and the second case to be extended and housed freely. The second coupling element is provided in the first case while being connected electrically with the first antenna element, the first coupling element is provided in the second case while being connected electrically with the first feeding section, and the first antenna element, the coupling section, and the ground pattern are operated as a dipole antenna.

7 Claims, 6 Drawing Sheets

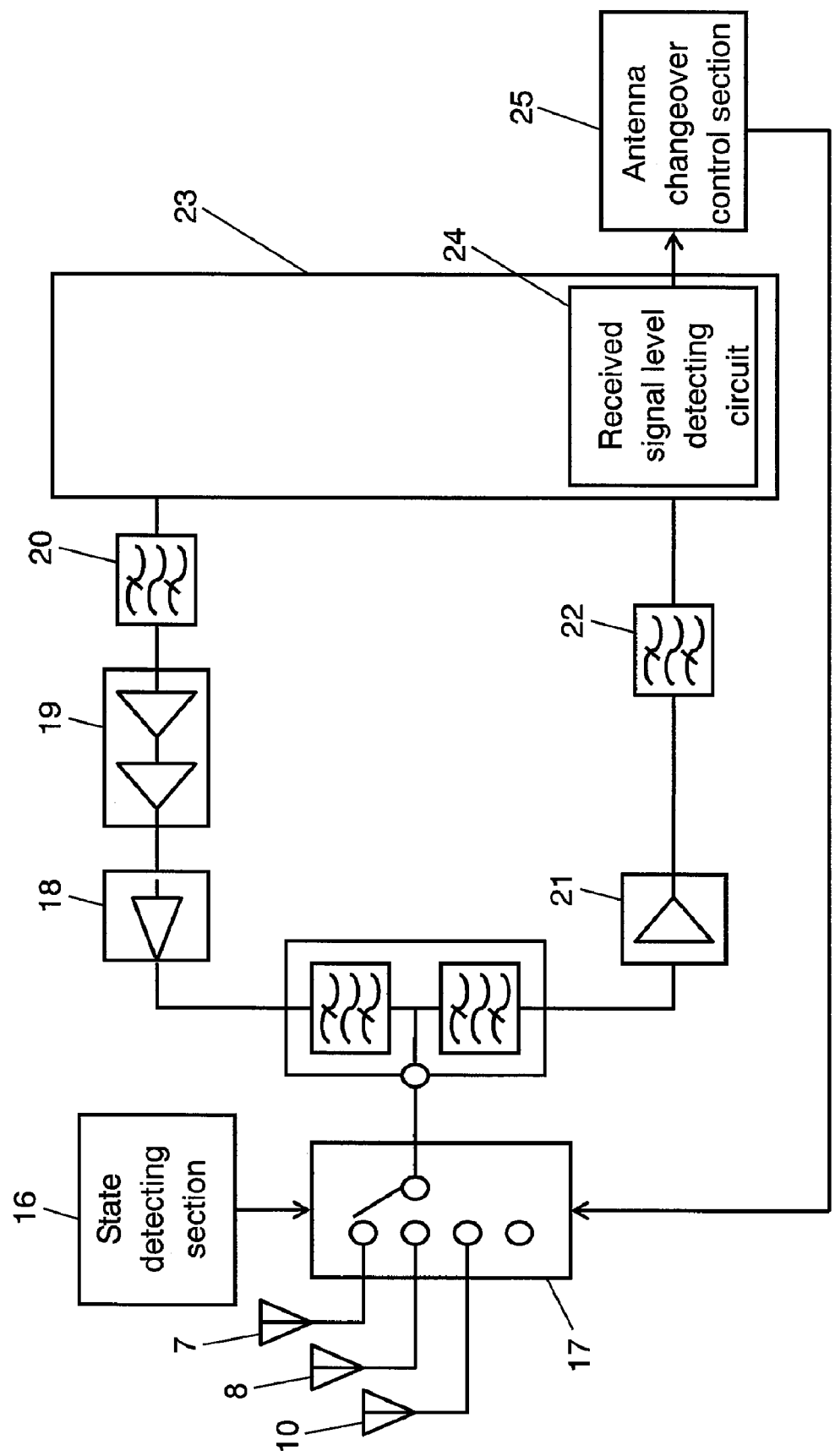

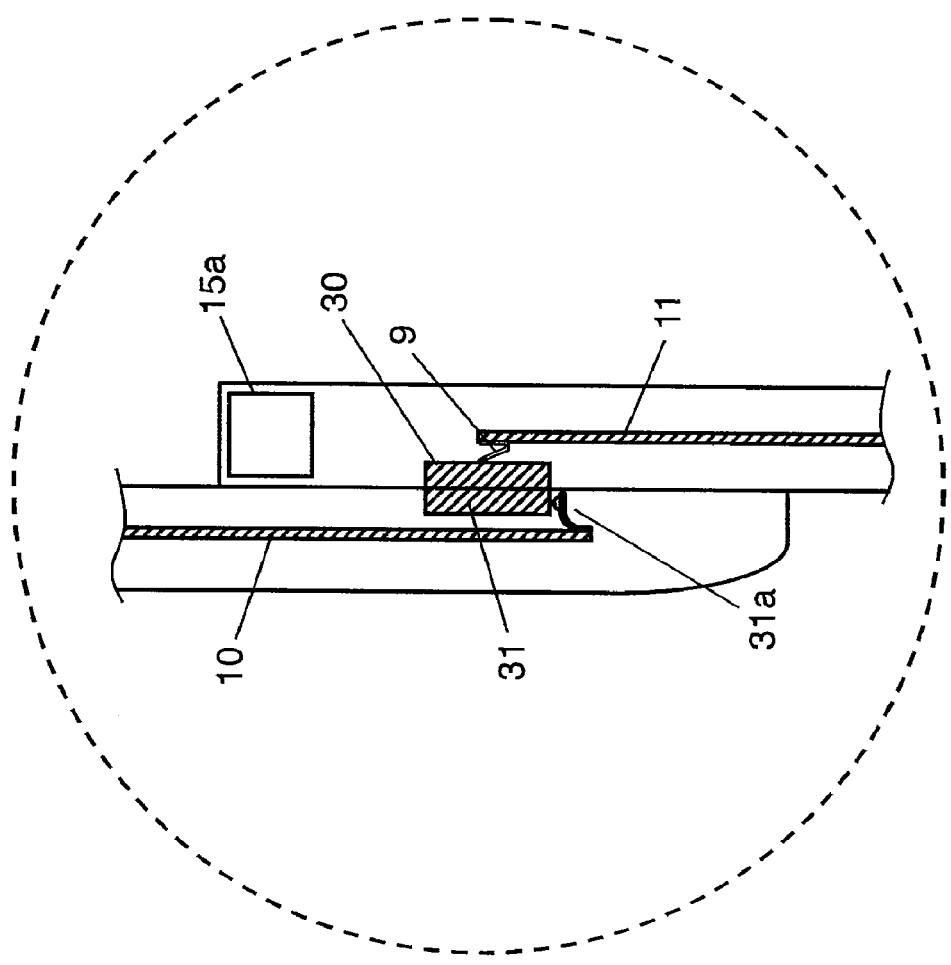
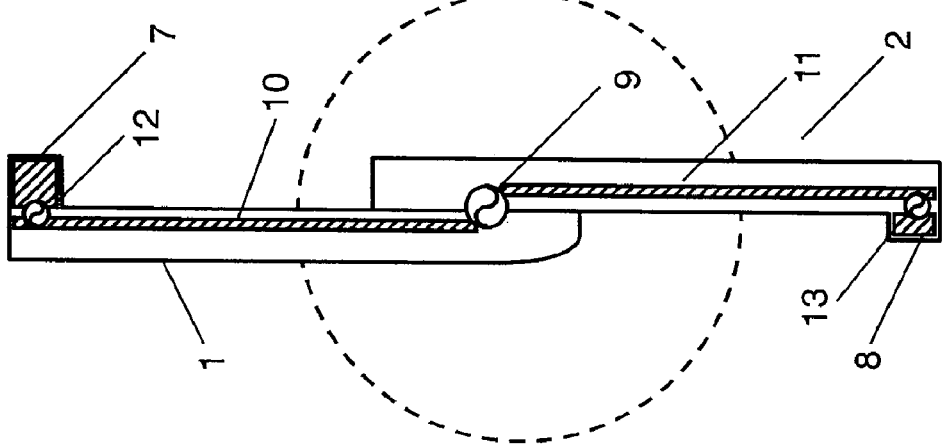

PORTABLE WIRELESS UNIT

This Application is a U.S. National Phase Application of PCT International Application PCT/JP2005/020771.

TECHNICAL FIELD

The present invention relate to a configuration and positions of antennas inside a portable wireless unit, for example one having a slide-type structure, especially for securing stable communication quality in response to a used condition of the unit.

BACKGROUND ART

Among slide-type cellular telephone sets consisting of an upper case, a lower case and a coupling section, a conventionally known cellular telephone set is one having a configuration where an antenna is provided in the vicinity of the coupling section of the lowercase, and the antenna is extended associated with an operation to extend the case when the case is opened, and is housed associated with an operation to house the case when the case is housed. With such a configuration, since a trouble of extension/retraction of the antenna is saved and the antenna is extended without fail in use of the cellular telephone set, it is possible to secure a conversation without provision of a protruded portion, so as to reduce a thickness of the set (Japanese Patent Unexamined Publication No. 2003-298695).

However, in the slide-type cellular telephone set described in Japanese Patent Laid-Open No. 2003-298695, although it is possible to realize reduction in size and enhancement in usability, there has been a problem with the configuration and position of the antenna in order to stably secure high quality antenna performance in either the extended or housed states.

DISCLOSURE OF THE INVENTION

The present invention was made for the purpose of solving the above conventional problem, and provides a high-performance portable wireless unit capable of keeping stable communication quality regardless of a used condition of a cellular telephone.

A portable wireless unit of the present invention has a first case and a second case, and comprises: a coupling section, coupling the first case and the second case to be extended and housed freely; a first antenna element and a second antenna element, provided at the first case; a third antenna element, provided in the second case; a circuit board, provided inside the second case and having a ground pattern; a first feeding section for feeding to the first antenna element connected to a wireless circuit section on the circuit board; a second feeding section for feeding to the second antenna element; and a third feeding section for feeding to the third antenna element. Here, the coupling section is formed of a first conductive coupling element and a second conductive coupling element which are electrically connected with each other, the second coupling element is provided at the first case and connected electrically with an end of the first antenna element, the first coupling element is provided in the second case and connected electrically with the first feeding section, and the first antenna element, the coupling section and a ground pattern on the circuit board are operated as a dipole antenna.

With this configuration, three antenna elements can be switched according to a usage pattern of the wireless unit, thereby to secure high antenna performance in either extended or housed states. Further, according to arrangement of the antenna elements in the portable wireless unit of the present invention, a relatively high antenna gain can be obtained even in a hand-held state, and the portable wireless unit of the present invention is thus useful as a cellular telephone unit that secures stable communication quality.

The portable wireless unit of the present invention further comprises: a state detecting section for detecting positions of the first case and the second case; and an antenna changeover section for switching an antenna element to be operated according to the state detecting section, and has a configuration where the antenna changeover section is controlled according to the positions of the first case and the second case which are detected in the state detecting section.

With this configuration, since the three antenna elements can be switched according to the usage pattern of the wireless unit, high antenna performance can be secured in either the extended or housed states.

The portable wireless unit of the present invention further comprises: a state detecting section for detecting positions of the first case and the second case; an antenna changeover section for switching an antenna element to be operated according to the state detecting section; a reception signal level detecting circuit, provided at the wireless circuit section; and a control section for controlling the antenna changeover section according to a level of a reception signal detected in the reception signal level detecting circuit.

With this configuration, since the three antenna elements can be switched according to the usage pattern of the wireless unit and further a level of a reception signal, high antenna performance can be stably secured in either the extended or housed states.

The portable wireless unit of the present invention is configured such that the first antenna element and the second antenna element which are arranged at the first case are switched to an operating state in the antenna changeover section when the first case and the second case are detected to be in an extended state, the second antenna element arranged in the first case and the third antenna element arranged at the second case are switched to an operating state in the antenna changeover section when the first case and the second case are detected to be in a housed state, and either of the antenna elements is selected according to the result detected in the reception signal level circuit.

With this configuration, since the three antenna elements can be switched according to the usage pattern of the wireless unit and further the level of the reception signal, high antenna performance can be stably secured in either the extended or housed states.

In the portable wireless unit of the present invention, the first antenna element is comprised of a conductive frame constituting a part of the first case.

With this configuration, since the need for providing the antenna element inside is eliminated, it is possible to reduce the case in size.

In the portable wireless unit of the present invention, the second antenna element is arranged at an opposite side end to the coupling section along a short-side direction of the first case, and the third antenna element is arranged at the opposite side end to the coupling section along a short-side direction of the second case.

With this configuration, since the antenna element is located apart from a hand-held position in use of the wireless unit, a relatively high antenna gain can be obtained even in a hand-held state.

The portable wireless unit of the present invention is configured such that each of the second antenna element and the third antenna element is formed in a protrusion with respect to a surface of the other case.

With this configuration, in the housed state, since each of the antenna elements serves as a stopper of the other case and is thus not covered by the other case, it is possible to obtain stable antenna performance and wireless performance even in the housed state.

As thus described, the portable wireless unit of the present invention comprises the second antenna element and the third antenna element inside the first case and the second case, in addition to the first antenna element provided at the first case, and the three antenna elements can be switched according to the usage pattern of the wireless unit, to secure high antenna performance in either the extended or housed states.

Moreover, in a state where the first case and the second case are extended, either the first antenna element or the second antenna element provided at the first case and the third antenna element provided in the second case can be operated as a dipole antenna and further diversified, to secure stable antenna performance.

Furthermore, with arrangement of the antenna elements of the portable wireless unit according to the present invention, it is possible to gain a relatively high antenna gain even in the hand-held state.

BRIEF DESCRIPTION OF THE DRAWINGS

FIG. 4 is a block diagram of a wireless circuit section in the slide-type portable wireless unit in the same embodiment of the present invention.

FIG. 5A is a side view showing a schematic configuration in the case of extending the slide-type portable wireless unit in the same embodiment of the present invention.

FIG. 5B is an expanded side view of a coupling section in the case of extending the slide-type portable wireless unit in the same embodiment of the present invention.

PREFERRED EMBODIMENTS FOR CARRYING OUT THE INVENTION

In the following, a best mode for carrying out the present invention is described with reference to drawings.

Embodiment

Figure 1:
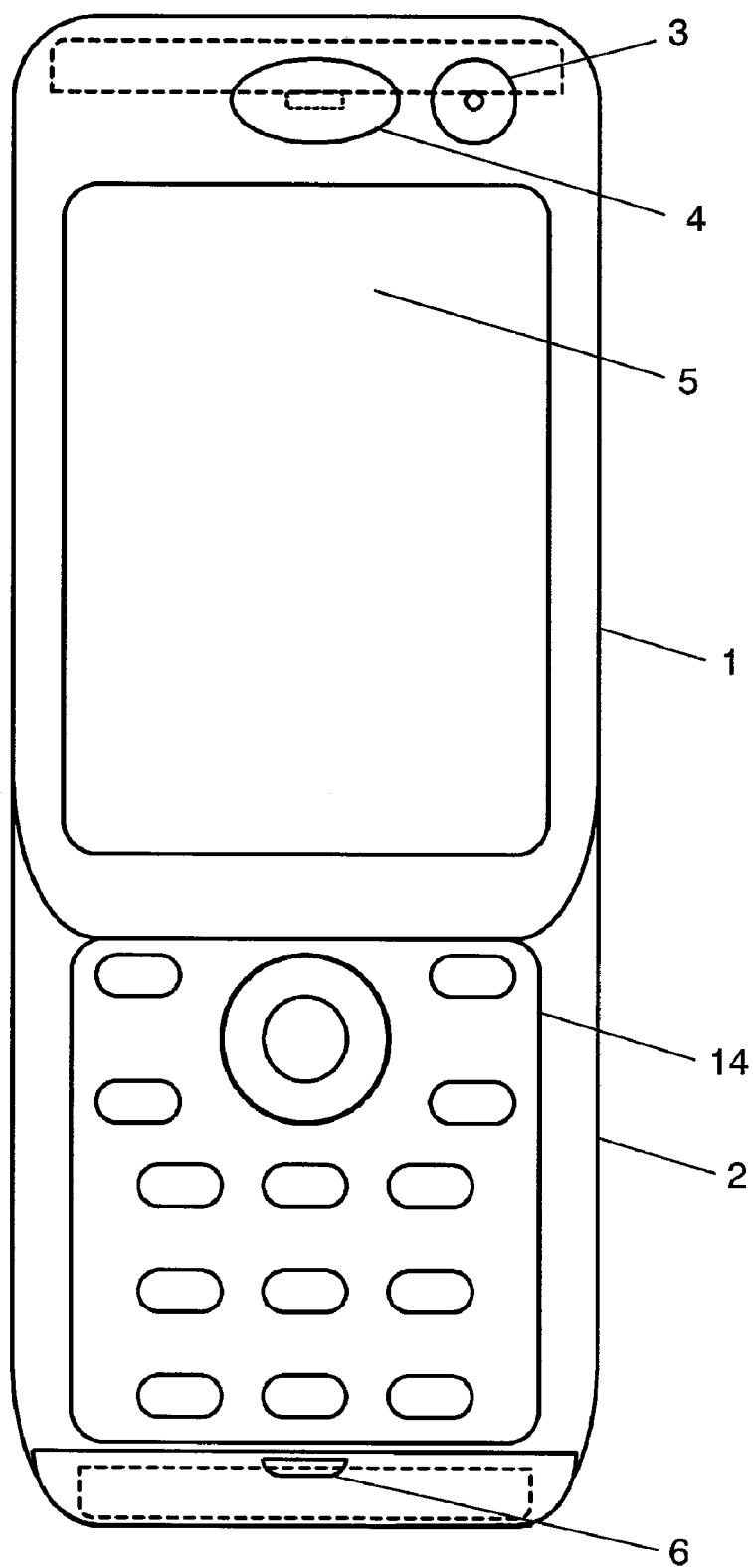
FIG. 1 is a front view in the case of extending a slide-type portable wireless unit in one embodiment of the present invention.
Figure 2:
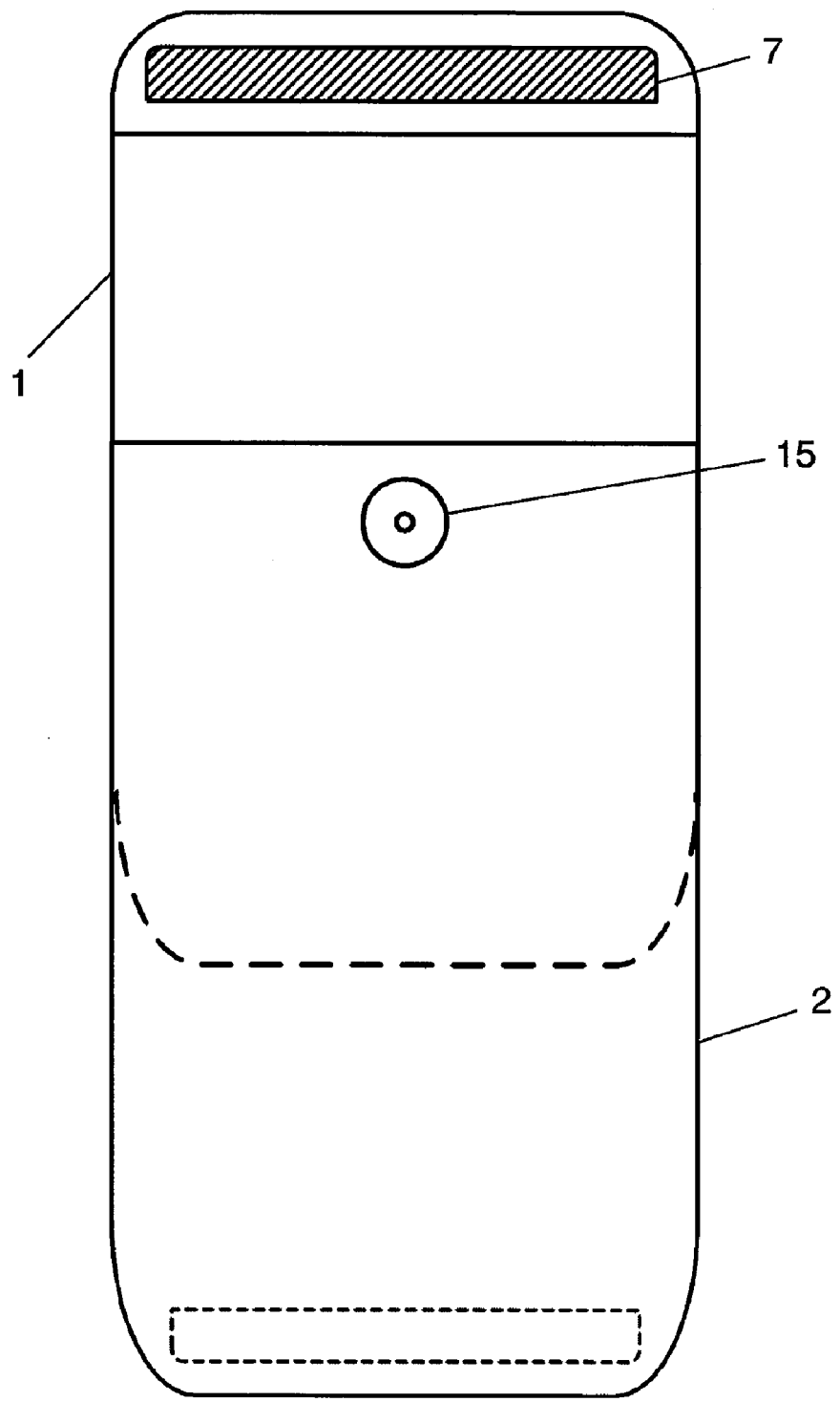
FIG. 2 is a rear view in the case of extending the slide-type portable wireless unit in the same embodiment of the present invention.

FIG. 1 is a front view of a slide-type portable wireless unit in one embodiment of the present invention, and FIG. 2 is a rear view of the slide-type portable wireless unit in the same embodiment of the present invention.

In FIG. 1, first case 1 comprises self-photographing camera 3 for photographing a user himself/herself, receiver 4 and display section 5, and second case 2 comprises microphone 6 and operating section 14. Further, although not shown, first antenna element is provided inside first case 1.

In FIG. 2, first case 1 comprises second antenna element 7 at its end along its short-side direction and opposite party photographing camera 15 for photographing a subject other than the user.

Figure 3:
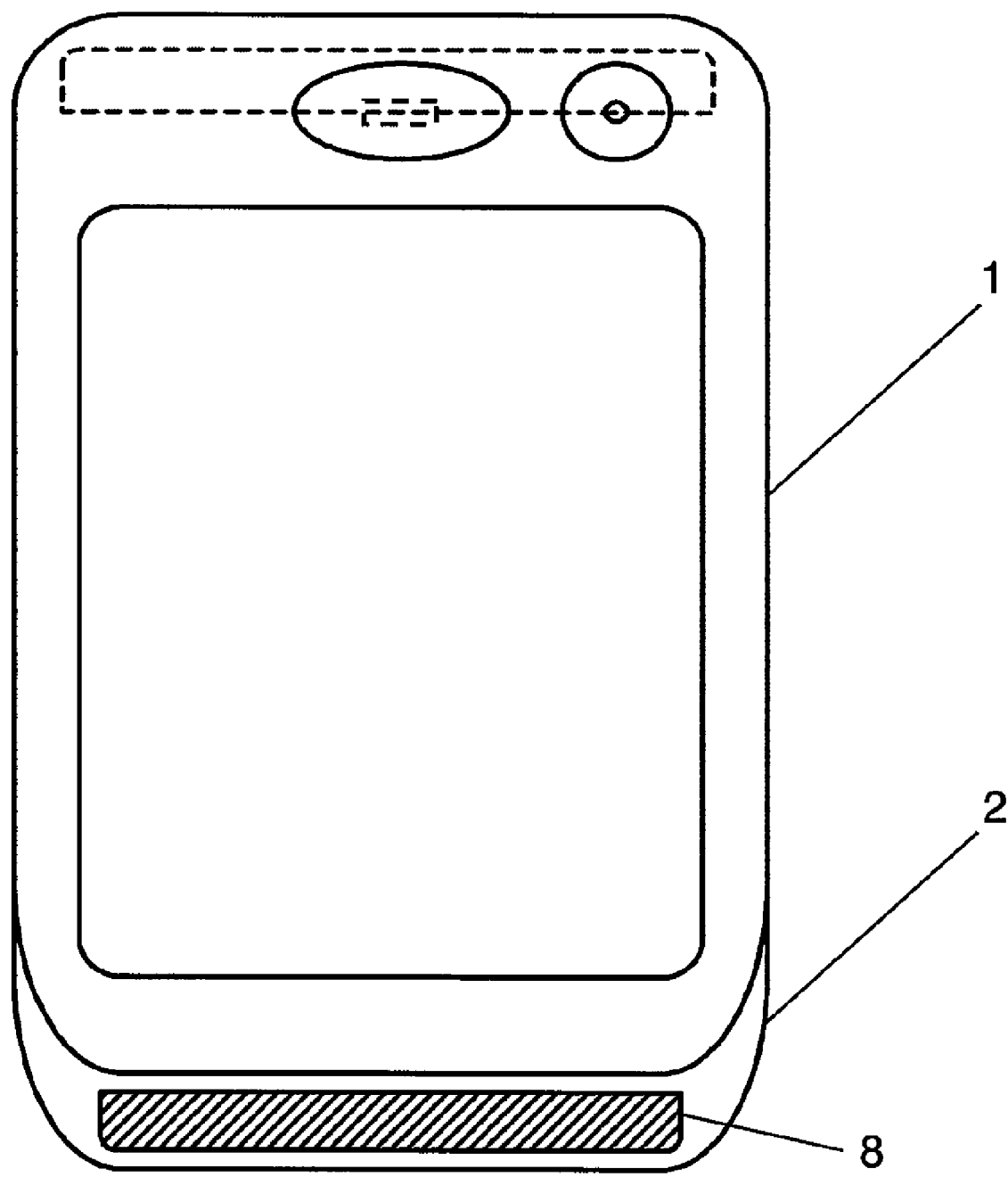
FIG. 3 is a front view in the case of housing the slide-type portable wireless unit in the same embodiment of the present invention.

FIG. 3 is a front view of the slide-type portable wireless unit in a housed state in the same embodiment of the present invention. In FIG. 3, second case 2 comprises third antenna element 8 at its end along its short-side direction. Further, although not shown, a circuit board having a ground pattern is provided at second case 2. As shown in FIGS. 2 and 3, in addition to first case 1, second antenna element 7 is arranged at first case 1 and third antenna element 8 is arranged at second case 2. Moreover, since arrangement of each antenna element at the end of the case along the short side direction of the case allows separation of the antenna element from a user's hand-held position, it is possible to secure an antenna gain.

It is to be noted that third antenna element 8 is configured to be arranged at the case different from the case in which self-photographing camera 3 and opposite party photographing camera 15 are arrange, so as to be resistant to noise (high harmonic) interference such as a cameral clock generated from self-photographing camera 3 or opposite party photographing camera 15.

FIG. 4 is a block diagram of a wireless circuit section in the slide-type portable wireless unit in the same embodiment of the present invention. In FIG. 4, a description of a functional block not relevant to the present invention is omitted.

In FIG. 4, state detecting section 16 detects an operating state of extension or housing of the slide-type portable wireless unit, to switch antenna changeover switch 17. Further, a reception signal level of each antenna element is detected in reception signal level detecting circuit 24, and antenna changeover control section 25 controls antenna changeover switch 17 to select an antenna with a high reception signal level.

With this configuration, even when the usage pattern of the slide-type portable wireless unit is changed to an open state where the case is extended or a housed state where the cases are superposed on each other, the antenna element can be switched according to the state of receiving each antenna and the usage pattern of the portable wireless unit, to secure stable communication quality.

FIG. 5A is a side view showing a schematic configuration of the slide-type portable wireless unit in the extended state in the same embodiment of the present invention. FIG. 5B is an expanded side view of the coupling section of the slide-type portable wireless unit in the extended state in the same embodiment of the present invention.

In FIG. 5A, first case 1 comprises first antenna element 10 and first feeding section 9 which is connected to a wireless circuit on the board inside second case 2 and feeds to first antenna element 10, and first case 1 further comprises second antenna element 7 and second feeding section 12 which is connected to the wireless circuit on the board and feeds second antenna element 7.

Second case 2 comprises circuit board 11 having a ground pattern, third antenna element 8 and third feeding section 13 which is connected to the wireless circuit on the board and comprises third feeding section 13 for feeding to third antenna element 8. In FIG. 5B, the coupling section is made of a conductive metal and consists of electrically connected first coupling element 30 and second coupling element 31. Second coupling element 31 arranged at first case 1 and first coupling element 30 arranged at second case 2 are coupled to each to each other to freely extend/retract the two cases.

In the state where the slide-type portable wireless unit is extended as in FIG. 5A, first antenna element 10, the coupling section, first coupling element 30, and the ground pattern of circuit board 11 inside second case 2 are operated as a dipole antenna. Further, when this extended state is detected, second antenna element 7 is also fed by second feeding section 12 to come into an operating state, the antenna with a higher received electrolysis level is detected in reception level detecting circuit 24, and either antenna is selected by antenna changeover switch 17. With this configuration, stable antenna performance and wireless performance are realized.

Further, although second antenna element 7 housed in first case 1 is arranged at the vicinity of self-photographing camera 3 and opposite party photographing camera 15 as shown in FIGS. 2 and 3, since second antenna element 7 is configured on the side opposite to self-photographing camera 3 with the board interposed therebetween inside second case 2 as shown in FIGS. 5A and 5B, second antenna element 7 can be arranged at a sufficient distance from the camera.

Figure 6C:
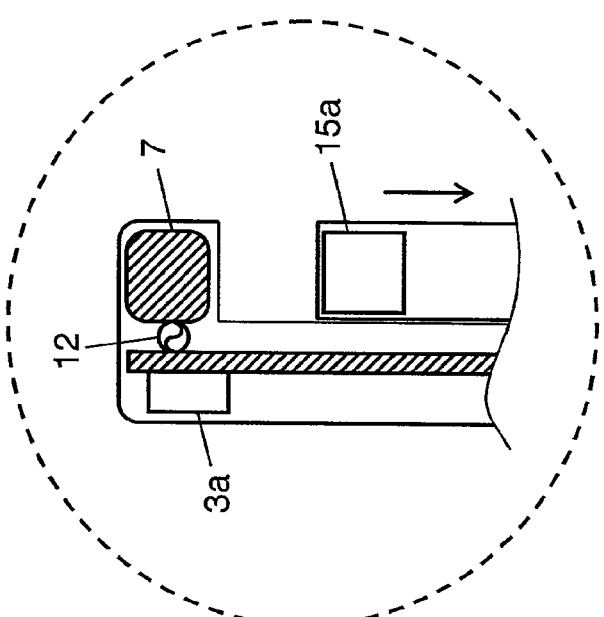
FIG. 6C is an expanded side view of the second antenna element portion in the case of shifting a state of the slide-type portable wireless unit from a housed state to an extended state in the same embodiment of the present invention.
Figure 6B:
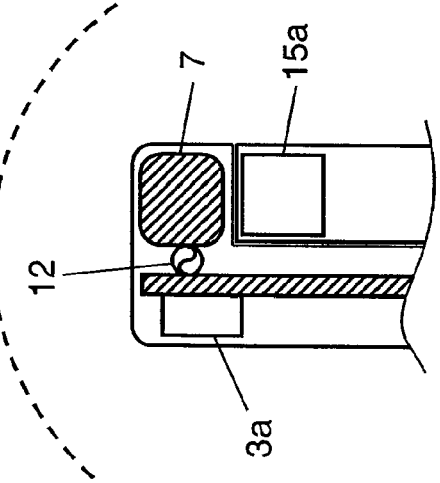
FIG. 6B is an expanded side view of a second antenna element portion in the case of housing the slide-type portable wireless unit in the same embodiment of the present invention.
Figure 6A:
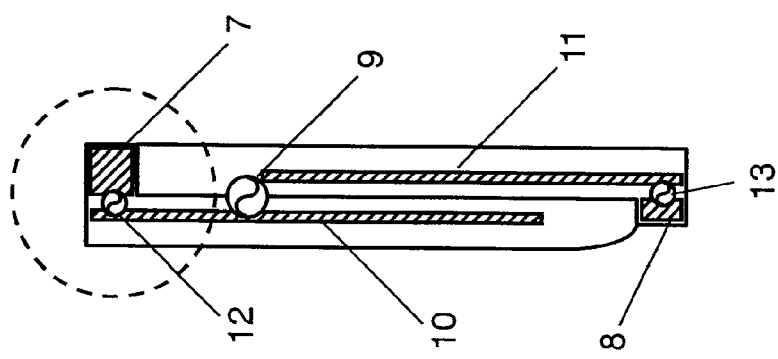
FIG. 6A is a side view showing a schematic configuration in the case of housing the slide-type portable wireless unit in the same embodiment of the present invention.

FIG. 6A is a side view showing a schematic configuration in the case of housing the slide-type portable wireless unit in the same embodiment of the present invention. FIG. 6B is an expanded side view of the portion of second antenna element 7 in the case of housing the slide-type portable wireless unit in the same embodiment of the present invention, and FIG. 6C is an expanded side view of the portion of second antenna element 7 in the case of shifting the state of the slide-type portable wireless unit from the housed state to the extended state in the same embodiment of the present invention. In FIGS. 6A, 6B and 6C, descriptions of the same constituents as those in FIGS. 5A and 5B are omitted.

As shown in FIGS. 6A, 6B and 6C, in a case where first case 1 and second case 2 of the slide-type portable wireless unit are housed as superposed on each other, when this housed state is detected, second antenna element 7 housed in first case 1 and third antenna element 8 housed in second case 2 are brought into the operating state, a reception level is detected in reception signal level detecting circuit 24, and the antenna with a higher reception level is selected in antenna changeover switch 17. With this configuration, wireless performance is secured also in the housed state of the slide-type portable wireless unit.

Further, as shown in FIGS. 6A, 6B and 6C, third antenna element 8 provided at second case 2 is configured to be formed in a protrusion with respect to a surface of the other case. Each of second antenna element 7 and third antenna element 8 is configured to serve as a stopper of the other case so as not to be covered by the other case when the slide-type portable wireless unit is housed. With this configuration, stable antenna performance and wireless performance are obtained also in the housed state.

Moreover, in the portable wireless unit of the present invention, arrangement of self-photographing camera 3 or opposite party photographing camera 15 is not limited to the above embodiment, but the camera can be arranged in the vicinity of second antenna element 7 provided inside first case 1.

Furthermore, first antenna element 10 in the present invention is not limited, for example, to first antenna element 10 shown in FIG. 5A in the above embodiment, but the whole or part of first case 1 may be comprised of, for example, a conductive frame for example formed of a conductive material such as magnesium to constitute first antenna element 10.

Although the slide-type portable wireless unit as one example of the present invention was described above, the present invention is not limited to this, but can also be applied to a revolver-type rotary portable wireless unit which rotates horizontally. In the case of the rotary portable wireless unit, since the same antenna arrangement as that of the slide-type portable wireless unit is possible, application of the present invention to the rotary portable wireless unit enables exertion of the same effect as in the case of applying the present invention to the slide-type portable wireless unit.

INDUSTRIAL APPLICABILITY

In the present invention, a portable wireless unit comprises a second antenna element and a third antenna element inside a first case and a second case, in addition to a first antenna element provided at the first case, and the three antenna elements are switched according to a usage pattern of the wireless unit, to secure high antenna performance in either extended or housed states. Further, with the arrangement of the antenna elements of the portable wireless unit in the present invention, a relatively high antenna gain can be obtained even in a hand-held state, and the portable wireless unit of the present invention is thus useful as a cellular telephone unit that secures stable communication quality.

The invention claimed is:

1. A portable wireless unit having a first case and a second case, comprising:
   a coupling section coupling the first case and the second case to be extended and housed freely;
   a first antenna element and a second antenna element, provided at the first case;
   a third antenna element provided at the second case;
   a circuit board provided inside the second case and having a ground pattern;
   a first feeding section for feeding to the first antenna element connected to a wireless circuit section on the circuit board;
   a second feeding section for feeding to the second antenna element; and
   a third feeding section for feeding to the third antenna element, wherein
   the coupling section is formed of a first conductive coupling element and a second conductive coupling element, which are electrically connected with each other,
   the second coupling element is provided at the first case and connected electrically with an end of the first antenna element,
   the first coupling element is provided at the second case and connected electrically with the first feeding section, and
   the first antenna element, the coupling section and a ground pattern on the circuit board are operated as a dipole antenna.

2. The portable wireless unit according to claim 1, further comprising:
   a state detecting section for detecting positions of the first case and the second case; and
   an antenna changeover section for switching an antenna element to be operated according to the state detecting section, wherein the antenna changeover section is controlled according to the positions of the first case and the second case which are detected in the state detecting section.

3. The portable wireless unit according to claim 1, further comprising:
- a state detecting section for detecting positions of the first case and the second case;
- an antenna changeover section for switching an antenna element to be operated according to the state detecting section;
- a reception signal level detecting circuit provided at the wireless circuit section; and
- a control section for controlling the antenna changeover section according to a level of a reception signal detected in the reception signal level detecting circuit.

4. The portable wireless unit according to claim 3, wherein the first antenna element and the second antenna element which are arranged at the first case are switched to an operating state in the antenna changeover section when the first case and the second case are detected to be in an extended state, the second antenna element arranged at the first case and the third antenna element arranged at the second case are switched to an operating state in the antenna changeover section when the first case and the second case are detected to be in a housed state, and in each switching, either of the antenna elements is selected according to a result detected in the reception signal level detecting circuit.

5. The portable wireless unit according to claim 1, wherein the first antenna element is a conductive frame constituting a part of the first case.

6. The portable wireless unit according to claim 1, wherein the second antenna element is arranged at an opposite side end to the coupling section along a short-side direction of the first case, and the third antenna element is arranged at the opposite side end to the coupling section along a short-side direction of the second case.

7. The portable wireless unit according to claim 1, wherein each of the second antenna element and the third antenna element is configured so as to be formed in a protrusion with respect to a surface of the other case.

* * * * *